United States Patent
Dimas et al.

(10) Patent No.: US 12,331,232 B2
(45) Date of Patent: Jun. 17, 2025

(54) PERMANENT COLOR-MATCHED PAINT TAPE

(71) Applicant: Color Communications, LLC, Chicago, IL (US)

(72) Inventors: Jerald Dimas, West Chicago, IL (US); James Ragen, Hinsdale, IL (US)

(73) Assignee: Color Communications, LLC, Chicago, IL (US)

( * ) Notice: Subject to any disclaimer, the term of this patent is extended or adjusted under 35 U.S.C. 154(b) by 0 days.

(21) Appl. No.: 18/310,836

(22) Filed: May 2, 2023

(65) Prior Publication Data

US 2024/0368431 A1    Nov. 7, 2024

(51) Int. Cl.
| | |
|---|---|
| *C09J 7/25* | (2018.01) |
| *B32B 7/12* | (2006.01) |
| *B32B 27/06* | (2006.01) |
| *B32B 27/36* | (2006.01) |
| *B32B 29/00* | (2006.01) |
| *C09J 7/38* | (2018.01) |

(52) U.S. Cl.
CPC ............ *C09J 7/255* (2018.01); *B32B 7/12* (2013.01); *B32B 27/06* (2013.01); *B32B 27/36* (2013.01); *B32B 29/002* (2013.01); *C09J 7/38* (2018.01); *B32B 2307/7376* (2023.05); *B32B 2307/748* (2013.01); *B32B 2405/00* (2013.01); *C09J 2301/124* (2020.08)

(58) Field of Classification Search
CPC ........ C09J 7/255; C09J 7/38; C09J 2301/124; B32B 7/12; B32B 27/06; B32B 27/36; B32B 29/002; B32B 2307/7376; B32B 2307/748; B32B 2405/00
See application file for complete search history.

(56) References Cited

U.S. PATENT DOCUMENTS

| | | | | |
|---|---|---|---|---|
| 4,457,718 A | * | 7/1984 | Lerner | .................... B44C 1/172 206/472 |
| 7,005,171 B2 | | 2/2006 | Lerner et al. | |

(Continued)

FOREIGN PATENT DOCUMENTS

| | | |
|---|---|---|
| CN | 113095368 | 7/2021 |
| EP | 4123089 | 1/2023 |

(Continued)

OTHER PUBLICATIONS

Machine Translation of JP2005-512862 A (Year: 2005).*

(Continued)

*Primary Examiner* — Patricia L. Nordmeyer
(74) *Attorney, Agent, or Firm* — Reinhart Boerner Van Deuren s.c.

(57) ABSTRACT

A tape for applying to a building surface prior to painting with an architectural paint having a color and a texture in which the tape remains in place after completion of the painting is described. The tape includes a substrate sheet, a pressure sensitive adhesive, and a coating. The tape is configured such that a portion of the coated side of the tape has a color and a texture that is similar or the same as the color and texture of the architectural paint. In this way, the portion of the building surface covered by the tape produces the general appearance and feel of the painted building surface after completion of the painting.

16 Claims, 3 Drawing Sheets

(56) References Cited

U.S. PATENT DOCUMENTS

| | | | |
|---|---|---|---|
| 7,914,285 B2* | 3/2011 | Boney | B44D 3/003 |
| | | | 434/103 |
| 2005/0196607 A1* | 9/2005 | Shih | B44C 1/16 |
| | | | 428/354 |
| 2006/0165979 A1* | 7/2006 | Kinsey | B44C 1/105 |
| | | | 156/239 |
| 2007/0154671 A1* | 7/2007 | Shih | B32B 27/14 |
| | | | 428/354 |
| 2008/0081142 A1* | 4/2008 | Zeik | C09J 7/29 |
| | | | 428/41.6 |
| 2008/0092457 A1* | 4/2008 | Malone | B32B 37/0076 |
| | | | 52/309.3 |
| 2010/0055371 A1* | 3/2010 | Edwards | B32B 27/18 |
| | | | 428/41.6 |
| 2016/0075118 A1* | 3/2016 | Kleppen | B32B 27/304 |
| | | | 156/220 |

FOREIGN PATENT DOCUMENTS

| | | | | |
|---|---|---|---|---|
| JP | 2002-200700 | | 7/2002 | |
| JP | 2004-053260 | | 2/2004 | |
| JP | 2005512862 A | * | 5/2005 | |
| WO | WO-9964235 A1 | * | 12/1999 | B32B 15/08 |
| WO | WO-02070623 A2 | * | 9/2002 | B32B 27/04 |

OTHER PUBLICATIONS

U.S. Appl. No. 18/178,361, filed Mar. 3, 2023.
International Search Report and Written Opinion for International Application No. PCT/US2024/059739, dated Apr. 4, 2025, 10 pages.

* cited by examiner

PERMANENT COLOR-MATCHED PAINT TAPE

BACKGROUND OF THE INVENTION

The present invention relates generally to the field of adhesive tapes. The present invention relates specifically to a tape that is color-matched to an architectural paint and permanently applicable to a building surface prior to painting with the architectural paint.

SUMMARY OF THE INVENTION

One embodiment of the invention relates to a tape for applying to a building surface prior to painting with an architectural paint having a color and a texture. The tape remains in place after completion of the painting to form an integral part of the painted surface.

The tape includes a substrate sheet having a first side and a second side. A pressure sensitive adhesive is applied to the first side of the substrate sheet. A coating is applied to the second side of the substrate sheet. At least a portion of the coated second side of the substrate sheet has a same color and a same texture as the architectural paint. The pressure sensitive adhesive provides the tape with a peel adhesion strength of at least 40 ounces of force per inch width of the substrate sheet.

Another embodiment of the invention relates to a kit for use in painting a surface. The kit includes a tape and a container of paint that is applicable and adherable to the surface. The tape includes a substrate sheet having a first side and a second side. A pressure sensitive adhesive is applied to the first side of the substrate sheet. A removable coversheet is applied to the pressure sensitive adhesive. An interface adhesive is applied to the second side of the substrate sheet. A coating is applied to the second side of the substrate sheet. At least a portion of the coated second side of the substrate sheet has a tape color that is the same color as a paint color of the paint.

Another embodiment of the invention relates to a method for generating a tape for applying to a building surface prior to painting with an architectural paint having a paint color and a paint texture such that the tape is configured to remain in place after completion of the painting. The method includes applying a coating to a casting web and curing the coating. The cured coating is compared to the architectural paint to determine if the cured coating has a coating color that is the same color as the paint color. The steps of applying the coating to the casting web, curing the coating, and comparing the cured coating to the architectural paint to determine if the cured coating has the coating color that is the same color as the paint color are repeated until the coating color is the same color as the paint color. The coating is combined with a transfer adhesive. The transfer adhesive includes a substrate sheet having a first side and a second side. A pressure sensitive adhesive is applied to the first side of the substrate sheet. A removable coversheet is applied to the pressure sensitive adhesive. An interface adhesive is applied to the second side of the substrate sheet. The casting web is removed from the coating and transfer adhesive.

Additional features and advantages will be set forth in the detailed description which follows, and, in part, will be readily apparent to those skilled in the art from the description or recognized by practicing the embodiments as described in the written description and claims thereof, as well as the appended drawings. It is to be understood that both the foregoing general description and the following detailed description are exemplary.

The accompanying drawings are included to provide further understanding and are incorporated in and constitute part of the specification. The drawings illustrate one or more embodiments, and together with the description serve to explain the principles and operation of various embodiments.

Alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, various embodiments of a permanent color-matched paint tape are shown. Embodiments of the tape discussed herein include an innovative layer composition design to provide for a variety of desired characteristics, including long-term adhesion to various surfaces, color matching to painted portions of a base surface, and texture matching to painted portions of a base surface. Traditionally, prior to painting a base surface, painter's tape is applied near an adjoining surface (trim, light switches, etc.) to protect the adjoining surface from being painted when painting near the interface of the base surface and adjoining surface. Typically, traditional painter's tape is removed after initially painting the base surface. Removal of traditional painter's tape can result in damaging paint underneath the painter's tape or require further touch-up painting near the edge of the tape covered surface. Applicant has found it beneficial to provide a paint tape that remains in place on the wall after painting the base surface and is configured to match the color and/or texture of the paint being applied to the base surface. This allows user to avoid unintentionally painting an adjoining surface by applying the paint tape to the base surface up to the interface of the base surface and adjoining surface, thereby only needing to paint the base surface up to the edge of the paint tape rather than up to the interface with the adjoining surface.

Figure 1:
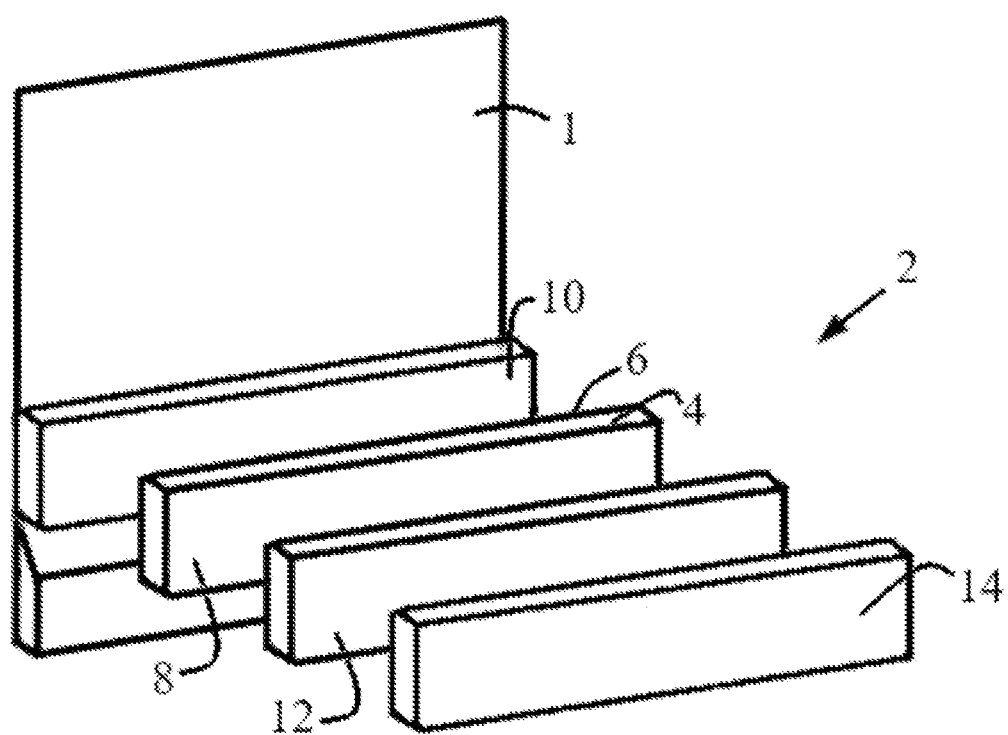
FIG. 1 is an exploded perspective view of layers of a tape applied to a base surface, according to an exemplary embodiment.

Referring to FIG. 1, an exploded perspective view of a paint tape 2 applied to a base surface 1 is shown according to an exemplary embodiment. Paint tape 2 includes a substrate sheet 4. Substrate sheet 4 has a first side 6 and a second side 8. Paint tape 2 includes a first adhesive 10 applied to the first side 6 of the substrate sheet 4. In a specific embodiment, paint tape 2 includes an interface adhesive 12 applied to the second side 8 of the substrate sheet 4. Paint tape 2 also includes a coating 14 applied to the second side 8 of the substrate sheet 4.

The substrate sheet 4 can be formed from a polyester material. In some embodiments, the substrate sheet 4 is formed from a clear polyester film. Alternatively, the substrate sheet 4 can be formed from a polypropylene material. The substrate sheet 4 can be formed from a transparent oriented polypropylene (OPP) film. The OPP film can have an acrylic coating on one side and a low temperature seal coating having an acrylic surface on the other side. In an alternative embodiment, the substrate sheet 4 is formed from a vinyl material. The substrate sheet 4 can be formed from a monomeric vinyl film. The width of the substrate sheet 4 defines the width of the paint tape 2. The thickness of the substrate sheet 4 is in a range of about 0.0005 inches to about 0.004 inches. In a specific embodiment, the substrate sheet 4 has a thickness of between 0.0005 inches and 0.0025 inches.

The coating 14 provides the paint tape 2 with an external color and texture. The coating 14 can include micronized pigments and/or metal complex dyes for color. In various embodiments, the coating 14 includes an architectural paint. Architectural paint includes interior building paints, exterior building paints, primers, sealers, varnishes and stains. The coating 14 can be formed from interior building paint. The coating has a thickness of between about 0.0005 inches and about 0.0015 inches.

As shown in FIG. 1, the interface adhesive 12 can be applied to the second side 8 of the paint tape 2 to adhere the coating 14 to the second side 8. In a specific embodiment, the interface adhesive 12 is applied as a layer between the second side 8 of paint tape 2 and the coating 14. In this embodiment, the interface adhesive 12 has a thickness of between about 0.00025 inches and about 0.00125 inches. Alternatively, the interface adhesive 12 can be combined with the coating 14 such that a coating 14 including the interface adhesive 12 is applied to the second side 8 of paint tape 2.

Figure 2:
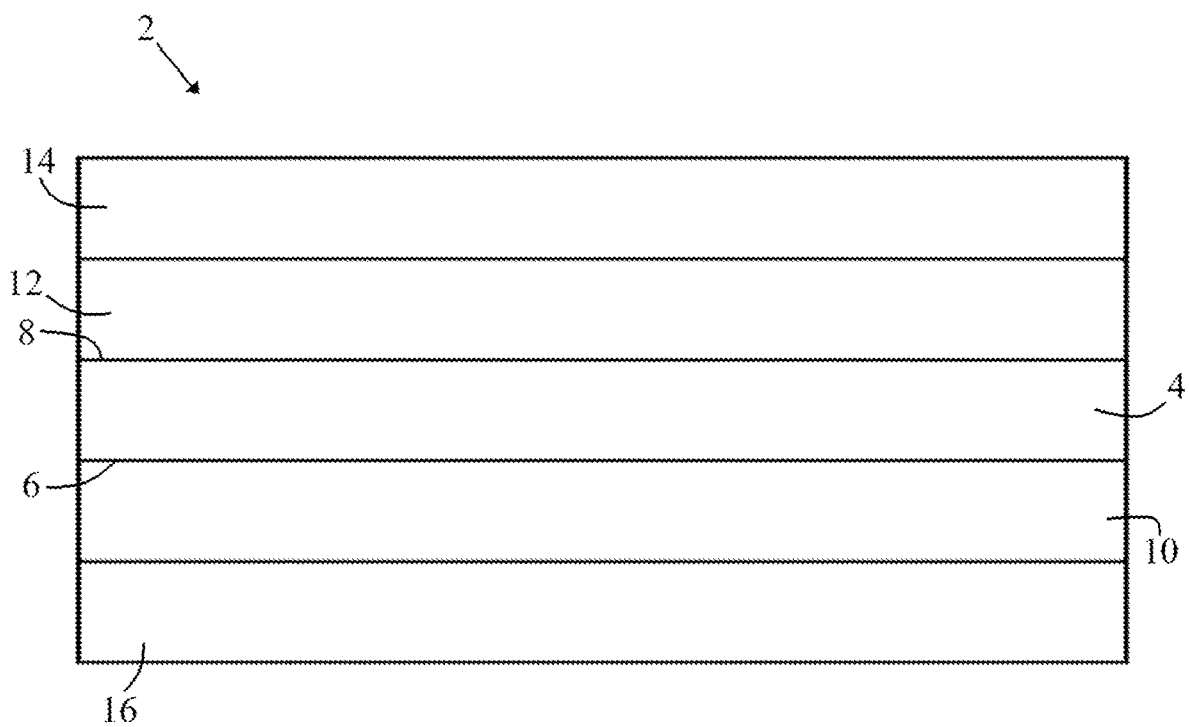
FIG. 2 is a side view of layers of a tape, according to an exemplary embodiment.

Referring to FIG. 2, a side view of a paint tape 2 is shown according to an exemplary embodiment. As shown in FIG. 2, the paint tape 2 includes a first adhesive 10 on the first side 6 of paint tape 2, opposite interface adhesive 12. The first adhesive 10 allows users to adhere the paint tape to a base surface 1. The first adhesive 10 can be a pressure sensitive adhesive. In an exemplary embodiment, the first adhesive 10 is a solvent-based pressure sensitive adhesive. Alternatively, the first adhesive 10 can be a heat-activated adhesive.

Throughout this document, peel adhesion strength is measured in accordance with the Pressure Sensitive Tape Council (PSTC) 101 International Standard for Peel Adhesion of Pressure Sensitive Tape Test Method A as applied to a glass surface. Peel adhesion strength is measured as the force in ounces per inch of width of the tape required to peel a tape away from a glass surface at a 180-degree angle and a rate of 5 mm/sec. Peel adhesion strength is measured after the tape has been applied to the glass surface for a 24-hour dwell period at 70 degrees Fahrenheit and 50% humidity.

In some embodiments, the first adhesive 10 provides the paint tape 2 with a peel adhesion strength that is at least 40 oz/in. The first adhesive 10 can provide the paint tape 2 with a peel adhesion strength of between 43 oz/in and 53 oz/in. In a specific embodiment, the first adhesive 10 provides the paint tape 2 with a peel adhesion strength that is at least 48 oz/in. In another embodiment, the first adhesive 10 provides the paint tape 2 with a peel adhesion strength of between 12 oz/in and 40 oz/in.

As shown in FIG. 2, the paint tape 2 can include a removable coversheet 16. Removable coversheet 16 is applied to the first adhesive 10 such that the first adhesive 10 is between the removable coversheet 16 and substrate sheet 4. Removable coversheet 16 protects the first adhesive 10 during storage and transport of the paint tape 2. Removable coversheet 16 can be removed prior to applying the paint tape 2 to a base surface 1. Removable coversheet 16 can include paper and have a thickness of between 0.002 inches and 0.007 inches. In a specific embodiment, the removable coversheet 16 is a printable release liner having a basis weight of 96 # or 96 pounds per ream or 500 sheets.

The first adhesive 10 adheres the paint tape 2 to removable coversheet 16 such that less force is required to peel paint tape 2 away from removable coversheet 16 than the peel adhesion strength of paint tape 2. In various embodiments, the force required to peel paint tape 2 away from removable coversheet 16 when measured under PSTC 101 Test Method A as applied to removable coversheet 16 ("the coversheet peel strength") is less than 40 ounces of force per inch width of paint tape 2. In a specific embodiment, the coversheet peel strength of paint tape 2 is less than 30 ounces of force per inch width of paint tape 2. In another embodiment, the coversheet peel strength of paint tape 2 is less than 12 ounces of force per inch width of paint tape 2.

Figure 3:
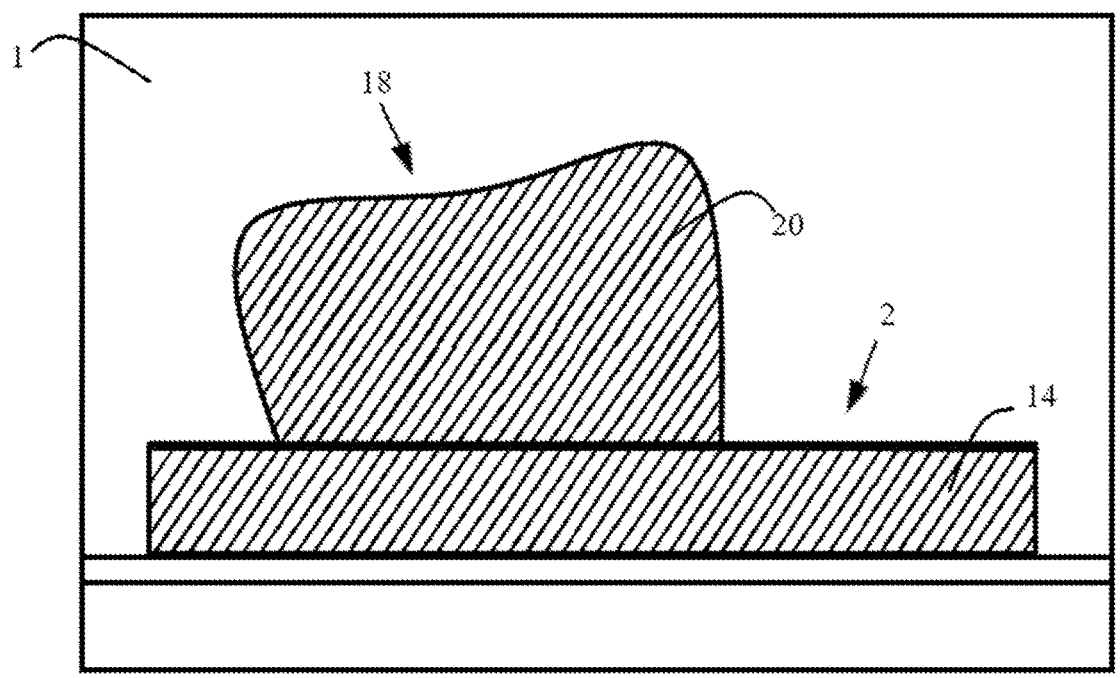
FIG. 3 is a front side view of a tape that is color-matched to a paint and applied to a portion of a base surface adjacent to a painted portion of the base surface, according to an exemplary embodiment.

Referring to FIG. 3, a paint tape 2 is shown applied to a base surface 1 according to an exemplary embodiment. Typically, paint tape 2 would be applied to base surface 1 prior to applying paint 20 to surface 1. Additionally, it is contemplated that during painting of surface 1, paint will be applied to at least a portion of paint tape 2. This allows the applicator of paint 20 to more efficiently apply paint because the applicator does not need to trim near non-painted structures adjacent to paint tape 2. Paint tape 2 adheres to base surface 1 via the first adhesive 10. Paint tape 2 is adjacent to a painted portion 18 of base surface 1 that is covered with a paint 20. According to an exemplary embodiment, base surface 1 is an interior wall of a building and paint 20 is an architectural paint.

Coating 14 is configured to provide at least a portion of the second side 8 of paint tape 2 with a tape color that is the same color as a paint color of the paint 20. A portion of the second side 8 of paint tape 2 has a surface area of at least one square inch. Throughout this document, color is measured as CIELAB coordinates. CIELAB coordinates include a lightness value, L*, measured on a scale from 0-100, wherein 0 represents black and 100 represents white, a green-red value, a*, wherein negative values indicate green color and positive values indicate red color, and a blue-yellow value, b*, wherein negative values indicate blue color and positive values indicate yellow color. A first color is the same as a second color if the ΔE ("Delta E") value between the CIELAB coordinates of the first color and the second color is less than or equal to 10. The ΔE value is defined by the following equation, commonly referred to as the CIE76 color difference formula:

$$\Delta E = \sqrt{\left(L_2^* - L_1^*\right)^2 + \left(a_2^* - a_1^*\right)^2 + \left(b_2^* - b_1^*\right)^2}$$

wherein ($L_1^*$, $a_1^*$, $b_1^*$) represents the CIELAB coordinates representing the first color and ($L_2^*$, $a_2^*$, $b_2^*$) represents the CIELAB coordinates of the second color.

According to an exemplary embodiment, the ΔE value between the tape color of the paint tape 2 and the paint color of the paint 20 is less than or equal to 20. Additionally, the ΔE value between the tape color of the paint tape 2 and the paint color of the paint 20 can be less than or equal to 10, such that the tape color and the paint color are the same color. In a specific embodiment, the ΔE value between the tape color of the paint tape 2 and the paint color of the paint 20 is less than or equal to 5. In another embodiment, the ΔE value between the tape color of the paint tape 2 and the paint color of the paint 20 is less than or equal to 2.

Throughout this document, texture is measured as arithmetic average roughness (Ra) of a surface. An Ra value is a mean of the absolute deviation from a mean line of the profile of a surface as measured over a 0.01-inch length of the profile. The mean line of a profile of a surface is a line corresponding to the average location of the profile with respect to deviations of the profile in a direction perpendicular to the surface. A first surface has the same texture as a second surface if an average Ra value of the first surface is within a 10 percent range above or below an average Ra value of the second surface. An average Ra value of a surface is the mean of Ra values of adjacent segments of a profile of the surface that span the entire profile.

Coating 14 is configured to provide at least a portion of the second side 8 of paint tape 2 with a tape texture that is the same texture as a paint texture of the paint 20, once the paint 20 has dried on the base surface 1. According to an exemplary embodiment, an average Ra value of the paint tape 2 is within 20 percent of an average Ra value of dried paint 20 on base surface 1. Additionally, an average Ra value of paint tape 2 can be within 10 percent of an average Ra value of dried paint 20 on base surface 1 such that paint tape 2 has a same texture as paint 20. In a specific embodiment, an average Ra value of the paint tape 2 is within 5 percent of an average Ra value of dried paint 20 on base surface 1. In another embodiment, an average Ra value of the paint tape 2 is within 2 percent of an average Ra value of dried paint 20 on base surface 1.

Coating 14 can also be configured to provide at least a portion of the second side 8 of paint tape 2 with a tape surface having the same coefficient of static friction as a paint surface of the paint 20, once the paint 20 has dried on the base surface 1. According to an exemplary embodiment, a coefficient of static friction of the paint tape 2 is within 20 percent of a coefficient of static friction of dried paint 20 on base surface 1. Additionally, a coefficient of static friction of paint tape 2 can be within 10 percent of a coefficient of static friction of dried paint 20 on base surface 1. In a specific embodiment, a coefficient of static friction of the paint tape 2 is within 5 percent of a coefficient of static friction of dried paint 20 on base surface 1. In another embodiment, a coefficient of static friction of the paint tape 2 is within 2 percent of a coefficient of static friction of dried paint 20 on base surface 1.

Figure 4:
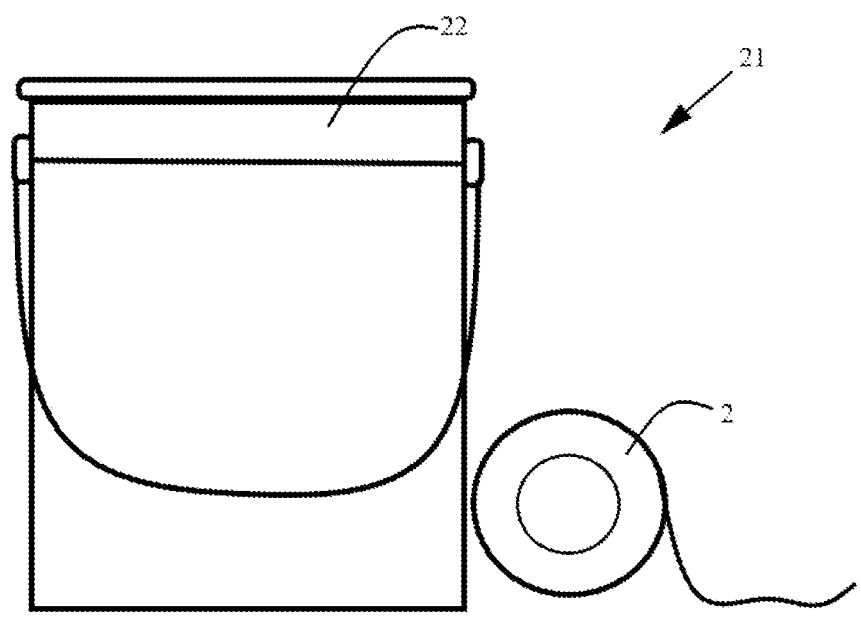
FIG. 4 is a front side view of a kit including a container of paint and a tape that is color-matched to the paint, according to an exemplary embodiment.

Referring to FIG. 4, a kit 21 including a container 22 of paint 20 and paint tape 2 is shown according to an exemplary embodiment. Container 22 stores paint 20 before adhering and applying paint 20 to a surface. Container 22 can be a can, cup, jar, bucket, tray, tube, or any other container used to store paints. The configuration of kit 21 provides users with paint 20 and paint tape 2 having the same or similar color and/or texture as paint 20. In a specific embodiment, coating 14 of paint tape 2 includes paint 20.

A paint tape 2 is generated for applying to a building surface prior to painting with an architectural paint having a paint color and a paint texture and for remaining in place after completion of the painting by first selecting a coating 14. The coating 14 is applied to a casting web. The casting web is a substrate used to generate the paint tape 2 on, from which the paint tape 2 can later be removed. The casting web can include a release-coated fabric, plastics, paper, silicone, or any other material suitable for generating paint tape 2 on and later removing paint tape 2 from. The coating 14 is cured. The coating 14 can be cured by air-drying, convection with heated air, infrared heating, UV radiation exposure, or electron-beam processing.

The cured coating 14 is compared to the architectural paint to determine if the cured coating has the same color as the paint color. If the color of coating 14 is not the same color as the paint color, then the process of selecting a coating 14, applying the coating to the casting web, and comparing the color of the coating to the paint color is repeated until the color of the coating 14 and the paint color are the same. If the color of coating 14 and the paint color are the same, then the coating 14 is combined with a transfer adhesive and the combination of the coating 14 and the transfer adhesive is removed from the casting web.

In an exemplary embodiment, the cured coating 14 is also compared to the paint to determine if the cured coating 14 has a coating texture that is the same texture as the paint texture. If the coating texture is not the same texture as the paint texture, then the process of selecting a coating 14, applying the coating to the casting web, and comparing the texture of the coating to the texture of the paint is repeated until the texture of the coating 14 and the paint texture are the same. If the texture and color of coating 14 are the same as the paint texture and the paint color, then the coating 14 is combined with the transfer adhesive and the combination of the coating 14 and the transfer adhesive is removed from the casting web.

The transfer adhesive includes substrate sheet 4 having first side 6 and second side 8. The transfer adhesive also includes first adhesive 10 on first side 6 of substrate sheet 4 and removable coversheet 16 applied to first adhesive 10. Transfer adhesive also includes interface adhesive 12 on second side 8. In a specific embodiment, interface adhesive 12 adheres coating 14 to the transfer adhesive. Coating 14 can include the paint having the paint color compared to the color of the coating 14. The paint can be paint 20.

The combination of the transfer adhesive and the coating 14 can be transported or shipped to a location that is distinct from the location where the transfer adhesive and coating 14 were combined. In an exemplary embodiment, the transfer adhesive and coating 14 is combined at a factory or manufacturing facility and shipped to a retail store, wholesaler, warehouse, other factory or manufacturing facility, or third-party place of business or residence.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

What is claimed is:

1. A tape for applying to a building surface prior to painting with an architectural paint having a color and a texture, the tape remaining in place after completion of the painting, the tape comprising:
    a substrate sheet having a first side and a second side;
    a pressure sensitive adhesive applied to the first side of the substrate sheet;
    a coating applied to the second side of the substrate sheet;
    wherein at least a portion of the coated second side of the substrate sheet has a same color and a same texture as the architectural paint; and
    wherein the pressure sensitive adhesive provides the tape with a peel adhesion strength of at least 40 ounces of force per inch width of the substrate sheet.

2. The tape of claim 1, further comprising an interface adhesive applied to the second side of the substrate sheet between the second side of the substrate sheet and the coating.

3. The tape of claim 1, wherein the substrate sheet comprises polyester.

4. The tape of claim 3, wherein the substrate sheet has a thickness of between 0.0005 inches and 0.0025 inches.

5. The tape of claim 1, further comprising a removable cover sheet applied to the pressure sensitive adhesive.

6. The tape of claim 1, wherein the coating comprises micronized pigments or metal complex dyes; and
    wherein the coating has a thickness of between 0.0005 and 0.0015 inches.

7. The tape of claim 1, wherein the coating comprises the architectural paint.

8. A kit for use in painting a surface, the kit comprising:
    a container including paint, the paint being applicable and adherable to the surface;
    a tape comprising:
        a substrate sheet having a first side and a second side;
        a pressure sensitive adhesive applied to the first side of the substrate sheet;
        a removable coversheet applied to the pressure sensitive adhesive;
        an interface adhesive applied to the second side of the substrate sheet;
        a coating applied to the second side of the substrate sheet; and
    wherein at least a portion of the coated second side of the substrate sheet has a tape color that is the same color as a paint color of the paint; and
    wherein the pressure sensitive adhesive provides the tape with a peel adhesion strength of at least 40 ounces of force per inch width of the substrate sheet.

9. The kit of claim 8, wherein the substrate sheet comprises polyester.

10. The kit of claim 9, wherein the substrate sheet has a thickness of between 0.0005 inches and 0.0025 inches.

11. The kit of claim 8, wherein the coating comprises micronized pigments or metal complex dyes; and
    wherein the coating has a thickness of between 0.0005 and 0.0015 inches.

12. The kit of claim 8, wherein the coating comprises the paint.

13. The kit of claim 8, wherein the pressure sensitive adhesive provides the tape with a peel adhesion strength of at least 48 ounces of force per inch width of the substrate sheet.

14. The kit of claim 8, wherein the pressure sensitive adhesive provides the tape with a peel adhesion strength of between 43 and 53 ounces of force per inch width of the substrate sheet.

15. The kit of claim 8, wherein the removable coversheet comprises paper and has a thickness of between 0.002 and 0.007 inches.

16. The kit of claim 8, wherein at least a portion of the coated second side of the substrate sheet has a same texture as the paint.

* * * * *